Oct. 12, 1965  JAMES E. WEBB  3,211,169
ADMINISTRATOR OF THE NATIONAL AERONAUTICS
AND SPACE ADMINISTRATION
SHRINK-FIT GAS VALVE
Filed Oct. 1, 1963
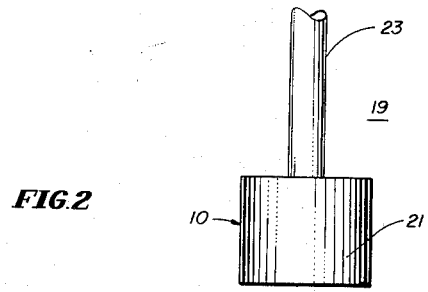
FIG.2
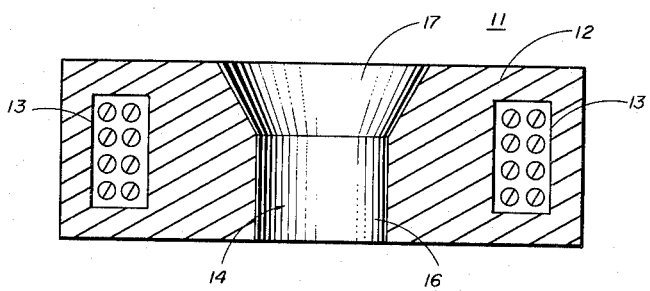
FIG.1
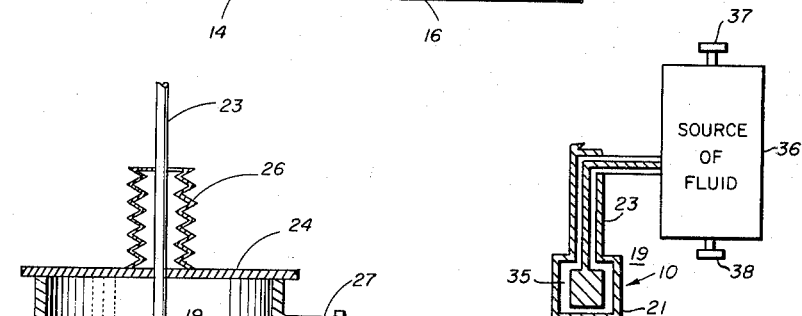
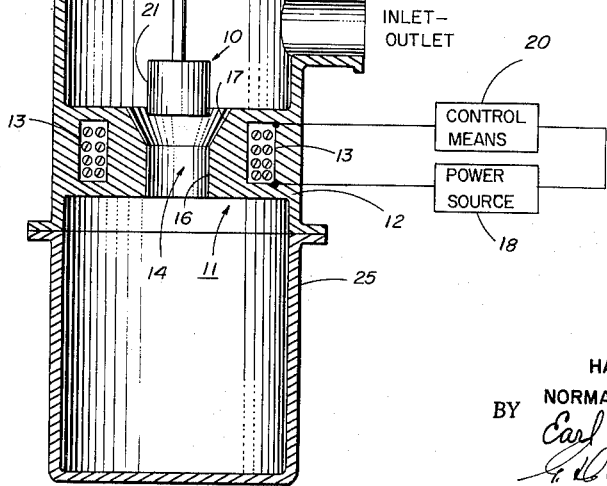
FIG.3
FIG.4
INVENTORS
HASELL W. CROUCH
NORMAN E. PETERSON, Jr.
BY
Earl Levy
G. D. O'Brien
ATTORNEYS

United States Patent Office 3,211,169
Patented Oct. 12, 1965

3,211,169
SHRINK-FIT GAS VALVE
James E. Webb, Administrator of the National Aeronautics and Space Administration with respect to an invention of Hasell W. Crouch, 12419 Starlight Lane, Bowie, Md., and Norman E. Peterson, Jr., 5638 Emerson St., Bladensburg, Md.
Filed Oct. 1, 1963, Ser. No. 313,135
2 Claims. (Cl. 137—340)

The present invention relates to an improved valve for a vacuum system, and more particularly, to an improved gas valve wherein a seal is formed by joining two pieces of material by a shrink-fit or expansion-fit method.

As will be readily observed, the valve described hereinafter, possesses advantages over prior art valves by being more durable, and by not having a tendency to break down. It also has the advantage of achieving an excellent seal without the use of gaskets such as O rings. In fact, it will maintain an effective seal against atmospheric pressure to a pressure at least as low as $10^{-6}$ millimeters of mercury. In addition, since the valve elements, in operation, do not relay on a friction fit and do not need to rub against each other, there is little wear due to friction. Further, the particular operation of the valve results in its being suitable for use where continuous functioning is desired.

The valve of the instant invention comprises an outer valve seat member having a heating element formed as an integral part thereof and an aperture passing therethrough, the aperture possessing a highly polished, seat-sealing surface; and an inner mating member having a stem or actuating arm and a plug attached thereto, the plug having a correspondingly highly polished, mating surface. The outer member and inner member are adapted to be joined and are sealed together by the use of a shrink or expansion-fit technique. By introducing heat to the outer member from the heating element, the outer member expands sufficiently so that, by operation of the stem, the plug portion of the inner member is permitted to be inserted into the aperture thereof. Upon the removal of heat from the outer member, the aperture therein shrinks and the seat-sealing surface thereof makes intimate contact with the mating surface of the plug of the inner member to form a shrink-fit therebetween. When the heating element is again energized, the aperture expands and allows the plug of the inner member to be withdrawn therefrom.

The exact nature of this invention, as well as other objects and advantages thereof, will be readily apparent from consideration of the following specification relating to the annexed drawing in which:

FIGURE 1 is a sectional view of the outer member of the gas valve of the invention;

FIGURE 2 is a front view of the inner member of the gas valve of the invention;

FIGURE 3 is a sectional view of a preferred embodiment of the invention; and

FIGURE 4 is a sectional view of another embodiment of the inner member having temperature variation means cooperating therewith.

Referring now to the drawing, there is shown in FIGURE 1 an outer valve seat member 11 comprising seat body 12 having electric heating element 13 contained therein and an aperture 14 substantially in the center thereof. Aperture 14 includes a cylindrical portion 16 having a highly polished, seat-sealing surface located below and coaxial with large funnel shape guide portion 17.

In FIGURE 2 there is shown inner mating member 19 comprising a plug 10 including cylindrical portion 21 having a highly polished, mating surface. Stem (actuating arm) 23 is connected to and coaxial with cylindrical portion 21 and is adapted to be operated by an actuating mechanism (not shown).

Seat body 12 of valve seat 11 and plug 10 of mating member 19 are made from materials having different coefficient of thermal expansion, such as different stainless steels, with the seat body 12 having the greater coefficient of thermal expansion. Alternatively, seat body 12 and plug 10 can each be made of materials having the same coefficient of thermal expansion as long as a temperature difference is maintained therebetween by, for example, heating elements in each member. The seat-sealing and mating surfaces of cylindrical portion 16 of aperture 14 and cylindrical portion 21 of plug 10, respectively, should have a high polish, mirror-like finish. While aperture 14 is shown having a cylindrical portion 21, these portions may alternatively be any round or elliptical configuration. Funnel portion 17 acts as a guide means to permit plug 10 to be easily inserted into or removed from aperture 14.

The gas valve of the present invention as shown in more detail in FIGURE 3 comprises valve seat 11 of FIGURE 1 and mating member 19 of FIGURE 2 operating in conjunction with each other and formed as an integral part of plumbing 24. The gas valve controls the fluid (gas) flow between inlet-outlet end 27 of plumbing 24 and vacuum chamber 25. Stem 23 of mating member 19 is connected to plumbing 24 by metal bellows seal 26. This seal prevents leakage from the plumbing while at the same time permits movement of plug 10 relative to aperture 14 of valve seat 11. Power source 18 is connected through control means 20 to electric heating element 13. Control means 20 can be, for example, a potentiometer, a switch (either mechanical or electronically operated), etc.

The following is a description of the operation of the gas valve shown in FIGURE 3. Control means 20 connects power source 18 to electric heating element 13, which in turn supplies heat to seat body 12 of valve seat 11 to achieve sufficient expansion thereof to allow plug 10 to be inserted into aperture 14. By an actuating means (not shown), stem 23 inserts plug 10 into aperture 14 of valve seat 11 such that the seat-sealing surface of cylindrical portion 16 of aperture 14 makes contact with the mating surface of cylindrical portion 21 of plug 10. Intimate contact between these surfaces results after valve seat 11 is cooled; and a shrink-fit coupling is obtained wherein full circumference of the valve connection is maintained under compression to achieve a good vacuum tight seal. Plug 20 can be withdrawn from aperture 14 if heat is again applied to seat body 12 of valve seat 11. In this particular embodiment of the invention, power is only applied to the heating element when it is desired to open or close the valve (remove or insert the plug in the aperture). When the valve is maintained in its closed and sealing condition, there is no power applied to the heating element. It is important to note that to maintain good operation of the gas valve the materials comprising it should not be compressed beyond their yield stress.

Should it be desirable to continually open and close the valve, then valve seat 11 would be alternatively heated and cooled. By such an operation of this gas valve, gases can be continually exhausted from vacuum chamber 25 to form a vacuum therein with the valve itself, in its closed condition, acting as the gas seal.

While the above description describes the operation of a gas valve in terms of alternatively heating and cooling seat body 12 of valve seat 11, the valve would function equally as well if plug 10 of mating member 19 were alternatively heated and cooled instead. It is also possible to utilize a combination of heating one of the elements or cooling the other. Temperature regulating means other than electrical elements will work equally as well. They may include a piping with a fluid passing therethrough to heat or to cool either of the members of the valve.

By properly controlling the tolerance of the valve seat and plug and by properly selecting the materials thereof so that they will have a desired difference in coefficient of thermal expansion, the environment wherein the valve is to be used can be heated to a very high temperature to permit surface degassing of the vacuum chamber and valve without affecting the valve seal itself. However, when the valve is designed for this high temperature degassing operation, the valve temperature must be increased above the degassing temperature before the valve seal will be broken to allow the valve to be opened. Alternatively, where it is desired that the valve seat and plug be made of materials having the same thermal coefficient of expansion, the plug should contain a cooling means (see FIGURE 4 to be described in more detail hereinafter) to permit shrinking it, thereby breaking the seal and allowing the valve to be opened. This will permit the valve to be taken to high temperatures for surface degassing, limited only by the properties of the material used.

Should it be desired that mating member 19 be heated or cooled, then, as shown in FIGURE 4, a fluid from a source of fluid 36 can be discharged into circulating system 35 contained within stem 23 and plug 10 of mating member 19. By controls 37 and 38, the temperature of the fluid applied to circulating system 35 can be regulated.

The foregoing disclosure relates to the pertinent embodiment of the invention. Numerous modifications or alterations may be made therein without departing from the spirit and scope of the invention set forth in the appended claims.

What is claimed is:

1. A reciprocating valve comprising a first member having an orifice therein with a seat-sealing surface; a second member having an enlarged end poppet portion of slightly greater dimension than said orifice and with an outer mating surface for sealing said orifice when said valve is in its closed condition; an electrically operated temperature means contained within said first member; a second temperature means cooperating with said second member; and control means coupled to both of said temperature means to control both of said temperature means so as to simultaneously regulate the temperature of said first member and said second member to permit said end poppet portion to be inserted into said orifice and to achieve a pressure seal between said seat-sealing surface and said mating surface.

2. In a pressure valve: a first member having an orifice therein with a seat-sealing surface; a second member of slightly greater dimension than said orifice and having an outer mating surface; actuating means connected to said second member for applying reciprocating motion to said second member; electrical temperature means contained within said first member; second temperature means associated with said second member; and control means coupled to both of said temperature means to operate them simultaneously for obtaining a temperature differential between said first and second members to cause a variation in size thereof so that said second member can either be inserted into or withdrawn from said orifice by said actuating means and for obtaining equalization in temperature of said first and second members so that said seat-sealing surface and said mating surface can make an intimate contact and form a pressure seal.

References Cited by the Examiner

UNITED STATES PATENTS

| | | | |
|---|---|---|---|
| 2,132,262 | 10/38 | Gabriel | 137—340 |
| 2,994,338 | 8/61 | Wilson | 137—340 |
| 3,028,874 | 4/62 | Burkett | 137—340 |
| 3,101,094 | 8/63 | McKenzie | 251—157 X |

ISADOR WEIL, *Primary Examiner.*